United States Patent [19]

Gershberg

[11] 3,929,751
[45] Dec. 30, 1975

[54] HIGH MOLECULAR WEIGHT ACRYLAMIDE POLYMER PRODUCTION BY HIGH SOLIDS SOLUTION POLYMERIZATION

[75] Inventor: David Benedict Gershberg, Stamford, Conn.

[73] Assignee: American Cyanamid Company, Stamford, Conn.

[22] Filed: Apr. 14, 1971

[21] Appl. No.: 133,977

[52] U.S. Cl.... 260/89.7 R; 260/78.5 R; 260/80.3 N; 260/80.75
[51] Int. Cl.². C08F 3/90; C08F 15/00; C08F 15/14
[58] Field of Search....... 260/80.3 N, 89.7 R, 80.75; 159/DIG. 10

[56] References Cited
UNITED STATES PATENTS

| | | |
|---|---|---|
| 3,002,960 | 10/1961 | Kolodny.......................... 260/89.7 R |
| 3,215,680 | 11/1965 | Kolodny.......................... 260/89.7 R |
| 3,280,086 | 10/1966 | Nakajima........................... 260/85.5 |
| 3,480,761 | 11/1969 | Kolodny................................ 210/54 |

OTHER PUBLICATIONS

Derwent Belgian Patent Report No. 35/67, (p. 2), Abst. of Belg. Pat. No. 694,342.

*Primary Examiner*—Christopher A. Henderson Jr.
*Attorney, Agent, or Firm*—Frank M. Van Riet

[57] ABSTRACT

A method of producing non-carboxylated, water-soluble polymers of acrylamide of high molecular weight and high solids (30–60%) comprising polymerizing acrylamide at 10–30°C., a pH of 4.7 – 5.9 and in the presence of a sodium bromate-sodium sulfite catalyst and water, at least one dimension of the reaction media having a thickness of not more than about ¾ inch, the concentration of said catalyst being determined by reference to the drawings.

5 Claims, 3 Drawing Figures

INVENTOR.
DAVID BENEDICT GERSHBERG
BY
ATTORNEY

HIGH MOLECULAR WEIGHT ACRYLAMIDE POLYMER PRODUCTION BY HIGH SOLIDS SOLUTION POLYMERIZATION

BACKGROUND OF THE INVENTION

This invention pertains to the field of high solids polymerization and particularly to a process for the polymerization of acrylamide into very high performance polymers. These acrylamide polymers are useful as flocculants, and high performance flocculants which settle industrial slurries and remove suspended matter from municipal or process water should be water-soluble and have as high a molecular weight as possible.

U.S. Pat. No. 3,002,960 describes the preparation of high molecular weight acrylamide polymer by aqueous solution polymerization with a bromate-sulfite catalyst in sulfite to bromate molar ratios of 0.1–0.8. Polymers made at about 20°C. have intrinsic viscosities of at least 12 (molecular weights of about 6 million). Those made below about 10°C. have intrinsic viscosities of at least 18 (molecular weights of at least 12 million). The usefulness of the process of this patent is limited to relatively low monomer solids, i.e, about 10–25%. Operation at high monomer solids has several advantages, e.g., less water to be removed etc. At high monomer solids, however, the teachings of the patent result in at least one of the following deficiencies: (a) excessive water-insoluble polymer is formed, (b) percent conversion of monomer to polymer is insufficient, (c) runaway reactions due to rapidly rising polymerization temperature and (d) production of polymers of low molecular weight.

SUMMARY

I have now found that the broad process of the above-identified patent can be advantageously modified utilizing a critical combination of operating conditions which permit the production of water-soluble, non-carboxylated acrylamide polymers of high molecular weight (at least 8–20 million). The polymerization is conducted at high monomer solids (at least about 30%) and conversions of at least 95% are achieved. Furthermore, my novel process yields polymers having these excellent properties at faster polymerization rates than previously and even the highest molecular weight polymer can be produced at ambient temperature.

DESCRIPTION OF THE DRAWINGS

The drawings set forth the critical catalyst concentrations which must be utilized at the varying monomer solids concentrations useful in the practice of the process of the present invention.

Similarly, FIG. 2 sets forth the ratio and concentration of the co-catalyst system which must be maintained during polymerization at monomer solids of 40% or more as represented by curve EFGHE, while

DESCRIPTION OF THE INVENTION INCLUDING PREFERRED EMBODIMENTS

As mentioned above, my novel process comprises producing a substantially completely non-carboxylated and substantially completely water-soluble acrylamide polymer having a molecular weight of at least about 8 million. By the term "substantially completely non-carboxylated" is meant that the polymer product contains less than about 1% carboxylation. By the term "substantially water-soluble" is meant that the polymer product contains less than about 1% insoluble polymers.

My process is useful in the polymerization of acrylamide, with or without monomers copolymerizable therewith, into high molecular weight polymers. Examples of monomers which may be copolymerized with acrylamide in amounts up to about 50%, by weight, based on the total weight of monomers, include acrylic acid, methacrylic acid, itaconic acid and the like.

The polymerization is conducted at a temperature ranging from about 10°C. to about 30°C., preferably fromm about 20°C. to about 30°C. Atmospheric pressure is preferred, however, superatmospheric and subatmospheric pressures may be used if necessary. At lower temperatures and 50–60% solids, the acrylamide monomers are not completely soluble in the water utilized and conversions are therefore very low. At higher temperatures, low molecular weight polymers result.

The reaction is conducted at a pH ranging from about 4.7 to about 5.9, preferably from about 5.2 to about 5.6. The pH is extremely critical and a lower pH causes runaway polymerization and/or insufficient final conversion while a higher pH yields low conversion.

As mentioned above, my novel process is conducted using monomer solids concentrations ranging from about 30% to about 60%, preferably at least about 45%. It is recognized, of course, that the higher monomer solids concentration employed, the more polymer produced per reaction and the lower amount of water which must ultimately be removed to produce a dry, powdery product.

At the high monomer solids concentration of my novel process, the rapid heat of polymerization generated must be effectively removed. I have found that removal of this heat of polymerization can be effected by maintaining the polymerizing mass in a suitable form such that at least one constant dimension thereof is small. That is to say, at leat one dimension of the reaction mass must have a thickness of not more than about ¾ of an inch, preferably ⅛ to ¾ inches, the higher the solids content, the thinner the reaction mass. To satisfy this critical limitation, the polymerizing mass may be maintained in the form of a sheet, rod, fiber, etc., so that at least one dimension is thin, the higher the monomer solids concentration, the thinner the reaction mass.

Figure 2:
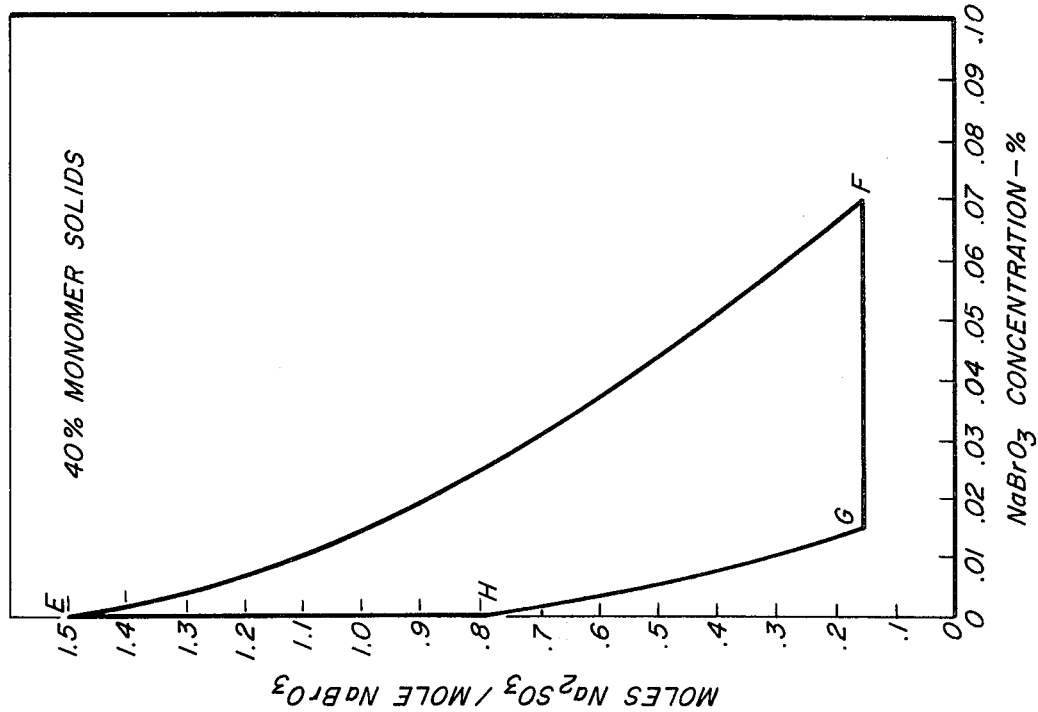
Figure 1:
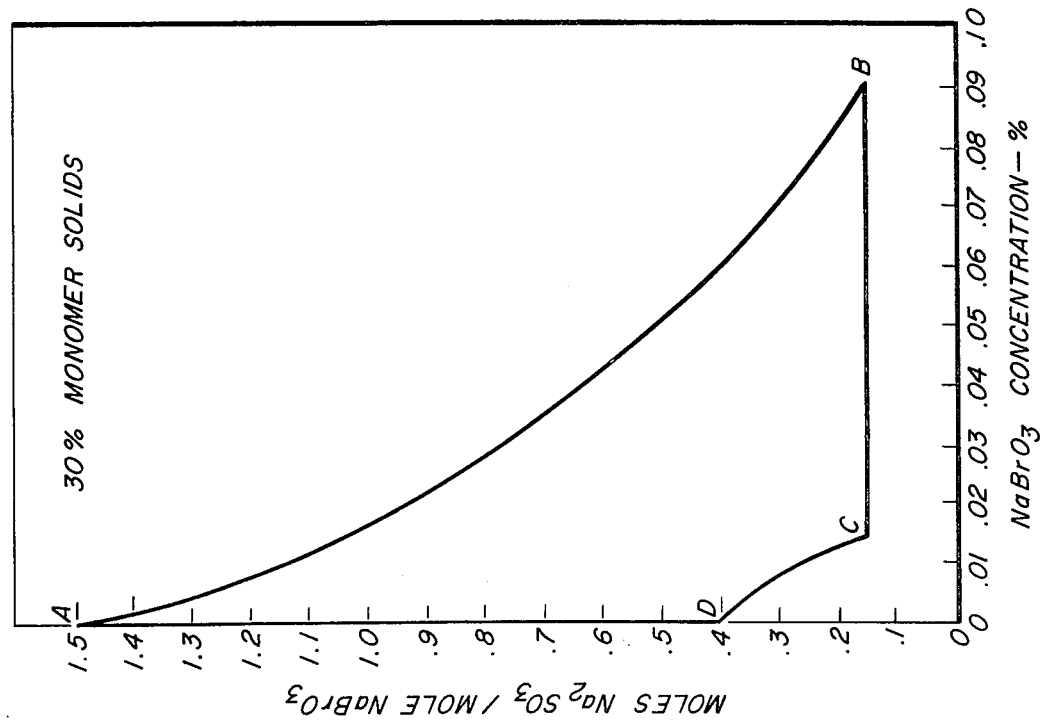
FIG. 1 depicts the sodium sulfite-sodium bromate molar ratio and sodium bromate concentration which must be maintained during polymerization according to the instant process at monomer solids of 30% or more. The critical concentrations are parametered by the curve ABCDA thereof, concentrations outside the curve being unsuitable.
Figure 3:
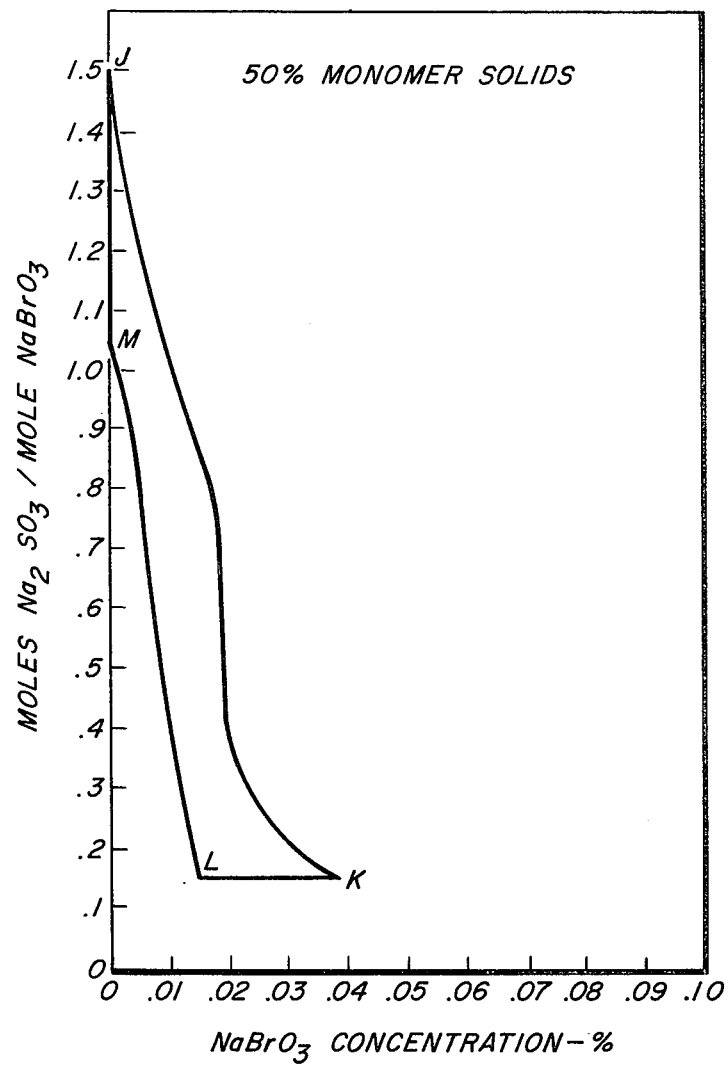
FIG. 3 shows the curve JKLMJ which encompasses the critical catalyst concentrations useful in practicing my invention at 50% monomer solids or more.

The final critical limitation of the present invention is in regard to the concentration of the catalyst employed. The catalyst, as mentioned above, is a sodium bromate-sodium sulfite mixture. The catalyst concentration must be maintained within well-defined limits in regard to the amount of sodium bromate employed and the amount of sodium sulfite used per mole of sodium bromate. Since the values for these concentrations vary radically depending primarily upon the monomer solids concentration being polymerized, a definite all-inclusive set of ratios is impossible to define. As a result, the catalyst concentration which must be employed regarding the monomer solids concentration undergoing polymerization must be ascertained from the accompanying drawings, the percentages of catalyst regarding polymerization of a 30% or more monomer solids media being derived from the curve indicated as ABCDA of FIG. 1 thereof. Reference to FIG. 2 of the drawings and curve EFGHE delineates the concentration of catalyst effective at 40% or more monomer solids while curve JKLMJ of FIG. 3 sets forth the catalyst concentration useful at 50% or more monomer solids. At catalyst concentrations outside the critical ranges outlined on the drawings, either insoluble polymer is produced, low molecular weights and/or insufficient conversion results or runaway polymerization is observed.

The following examples are set forth for purposes of illustration only and are not be construed as limitations on the present invention except as set forth in the appended claims. All parts and percentages are by weight unless otherwise specified.

In each example, the polymerization is conducted in a thin layer reactor of typical configuration and equipped with nitrogen gas inlet and outlet, monomer solution inlet and stirrer. The pH of the aqueous monomer solution is adjusted to the indicated level with sufficient sodium hydroxide or sulfuric acid. The monomer solution is sparged in the holding tank with nitrogen for one hour while the reactor is also being purged therewith. Conversion of monomer to polymer is determined polarographically.

The weight average molecular weights of the polymers produced according to the process of the present invention are obtained from intrinsic viscosity measurements using the formula $$\text{intrinsic viscosity (deciliters/g)} = 3.73 \times 10^{-4} (M)^{0.66}.$$

Measurements of either intrinsic viscosity and Brookfield viscosity on acrylamide polymer samples permit the molecular weight to be estimated. Viscosity data were obtained on 0.1% solutions of the polymer in 1N sodium chloride at 25°C. and pH 5.5 using a Brookfield LVT viscosimeter with a UL adapter at 60 rpm. A viscosity of at least 4.40 c.p. designates a polymer having an intrinsic viscosity of at least 13 and a molecular weight of at least 8 million. A viscosity of at least 7.48 c.p. designates a polymer having an intrinsic viscosity of at least 24 and a molecular weight of at least 20 million.

EXAMPLE 1

(Comparative)

To a suitable reaction vessel equipped as indicated above are charged 37.5 parts of acrylamide and 37.5 parts of deionized water. The catalyst concentration and pH are varied as indicated in Table I, below. The thickness of the intitial unpolymerized acrylamide reaction mass is ¼ inch, the temperature is maintained at about 25°C. with a liquid bath, and the polymerization time is 3 hours. The results are indicated in the table.

TABLE I (Comparative)
POLYMERIZATIONS AT 50% SOLIDS

| Run No. | pH | NaBrO$_3$ Conc., (%) | Moles Na$_2$SO$_3$ Mole NaBro$_3$ | Maximum Temp. (°C.) | Insolubles | Conversion (%) | Brookfield Viscosity of 0.1% Polymer Solution (C.P.) | Remarks |
|---|---|---|---|---|---|---|---|---|
| 1 | 3.0 | .002 | .30 | 25 | — | Low[a] | — | Low conversion |
| 2 | 3.0 | .002 | .80 | 30 | — | Low[a] | — | Low conversion |
| 3 | 3.0 | .005 | .30 | 30 | — | Low[a] | — | Low conversion |
| 4 | 3.0 | .005 | .80 | 36 | — | Low[a] | — | Runaway PZN and low conversion |
| 5 | 3.0 | .02 | .30 | 28 | — | Low[a] | — | Low conversion |
| 6 | 3.0 | .02 | .80 | 43 | — | Low[a] | — | Runaway PZN and low conversion |
| 7 | 4.0 | .005 | .80 | 32 | Yes | — | — | Runaway PZN and insolubles |
| 8 | 4.0 | .01 | .30 | 27 | Yes | 44 | 4.08 | Insolubles and low conversion |
| 9 | 4.5 | .002 | .80 | 26 | Yes | — | — | Insolubles |
| 10 | 4.5 | .005 | .80 | 28 | Yes | — | — | Insolubles |
| 11 | 4.5 | .005 | 1.20 | 39 | No | 89 | 5.45 | Runaway PZN and low conversion |
| 12 | 4.5 | .01 | .30 | 26 | Yes | — | — | Insolubles |
| 13 | 4.5 | .01 | .54 | 48 | Yes | 78 | 1.50 | Runaway PZN and insolubles and low conversion |
| 14 | 4.5 | .01 | .80 | 44 | — | — | — | Runaway PZN |
| 15 | 4.5 | .015 | .30 | 28 | Yes | 73 | 1.46 | Insolubles and low conversion |
| 16 | 4.5 | .02 | .30 | 53 | Yes | 55 | — | Runaway PZN and insolubles and low conversion |
| 17 | 4.5 | 0.3 | .06 | 29 | Yes | 30 | — | Insolubles and low conversion |
| 18 | 4.7 | .005 | .12 | 25 | — | Low[a] | — | Low conversion |
| 19 | 4.7 | .005 | .30 | 25 | Yes | — | — | Insolubles |
| 20 | 6.0 | .005 | .80 | 25 | — | Low[a] | — | Low conversion |
| 21 | 6.0 | .02 | .30 | 26 | No | 51 | — | Low conversion |
| 22 | 6.0 | .03 | .30 | 27 | Yes | 69 | 3.95 | Insolubles and low conversion |

[a] Low conversion evident from appearance of non-rubbery viscous gel containing substantial free flowing liquid
PZN = polymerization This example shows that the broad claims of U.S. Pat. No. 3,002,960 are not applicable to operation at 50% monomer solids. The results of Table I show that none of the runs yielded water-soluble polymer, substantially free of insolubles, having a molecular weight of at least 8 million at high conversions. Some runs yielded insufficient conversions (44–89%) or conversions which were obviously too low judging from the appearance of non-rubbery viscous gels containing substantial quantities of free flowing liquid. Some conditions yielded runaway polymerization in which the polymerization temperature rose 11°–28°C. despite bath temperatures being very much lower (35°–65°C. lower) than the nominal polymerization temperature during the period of peak heat release. Some runs yielded both runaway polymerization and low final conversion.

The effect of pH is shown to be critical at high solids. A pH of 4.5 is suitable at 10% monomer solids since all the examples of U.S. Pat. No. 3,002,960 employ this pH, i.e. the normal pH of an aqueous solution of acrylamide. However, as can be seen from Table I, at 50% monomer solids, a pH of 4.5 is unsuitable as is a pH of 3.0.

EXAMPLE 2

Following the procedure of Example 1 except that the pH is adjusted to 5.5, all else remaining substantially equal, additional runs are conducted. The results are set forth in Table II, below.

TABLE II

POLYMERIZATION AT 50% SOLIDS

| Run No. | NaBrO$_3$ Conc. (%) | Moles Na$_2$SO$_3$ Mole NaBrO$_3$ | Maximum Temp. (°C.) | Insolubles | Conversion (%) | Brookfield Viscosity of 0.1% Polymer Solution (C.P.) | Carboxyl Content of Polymer (%) | Remarks |
|---|---|---|---|---|---|---|---|---|
| 1 | .005(C) | .30 | 25 | Yes | 51 | — | — | Insolubles and low conversion |
| 2 | .005(C) | .80 | 27 | Yes | 78 | 3.75 | — | Insolubles and low conversion |
| 3 | .005 | 1.2 | 26 | No | 98.4 | 5.10 | — | Excellent product |
| 4 | .01(C) | .30 | 25 | Yes | — | — | — | Insolubles |
| 5 | .01 | .80 | 26 | No | 99.2 | 4.53 | — | Excellent product |
| 6 | .015 | .54 | 26 | No | 99.92 | 4.68 | — | Excellent product |
| 7 | .02 | .18 | 26 | No | 97.2 | 7.06 | — | Excellent product |
| 8 | .02 | .30 | 26 | No | 98.3 | 5.56 | <1 | Excellent product |
| 9 | .02 | .30 | 26 | No | 95.8 | 5.53 | <1 | Excellent product |
| 10 | .02 | .30 | 26 | No | 97.3 | 4.60 | 21 1 | Excellent product |
| 11 | .02 | .30 | 28 | No | 97.8 | 4.56 | <1 | Excellent product |
| 12 | .02 | .30 | 26 | <1% | 96.7 | 4.70 | — | Excellent product |
| 13 | .02 | .30 | 25 | <1% | 99.6 | 5.46 | — | Excellent product |
| 14 | .02 | .30 | 30 | No | 98.8 | 5.78 | — | Excellent product |
| 15 | .02(C) | .43 | 26 | No | 99.4 | 3.85 | — | Insufficient molecular weight |
| 16 | .02(C) | .80 | 24 | No | 99.6 | Low | — | Insufficient molecular weight |
| 17 | .03(C) | .30 | 27 | No | 99.0 | 3.82 | — | Insufficient molecular weight |
| 18 | .04(C) | .12 | 34 | Yes | 92.0 | 1.51 | — | Runaway polymerization and insolubles |

(C) = comparative

It can be seen from a perusal of Table II that operation within the limits of the present invention produces an excellent product. The critical conditions of pH and catalyst concentration are not taught by U.S. Pat. No. 3,002,960 or other prior art. Note especially that a higher molar ratio of sulfite to bromate is suitable, e.g., 1.2 than the maximum (0.8) shown in said patent.

EXAMPLE 3

Again following the procedure of Example 1 except that the pH is 5.5, and the NaBrO$_3$ concentration is maintained at 0.02% a series of runs are conducted varying the monomer solids content, polymerization temperature and reaction mass thickness. All else remains substantially equal. The results are set forth in Table III, below.

TABLE III

| Run No. | Solids (%) | Mass Thickness (in.) | Moles Na$_2$SO$_3$ Mole NaBrO$_3$ | Nominal Temp. (°C.) | Maximum Temp. (°C.) | Insolubles | Conversion (%) | Brookfield Viscosity of 0.1% Polymer Solution (C.P.) | Remarks |
|---|---|---|---|---|---|---|---|---|---|
| 1 | 50(C) | 1/4 | .30 | 5 | 5 | — | Low$^{(a)}$ | — | Low conversion |
| 2 | 50 | 1/4 | .30 | 15 | 17 | <1% | 97.8 | 4.80 | Excellent product |
| 3 | 50(C) | 1/4 | .30 | 35 | 40 | Yes | 91.8 | 2.50 | Insolubles |
| 4 | 50(C) | 3/8 | .30 | 25 | 28 | <1% | 94.0 | 3.89 | Very low bath temp.$^{(b)}$ and insufficient molecular weight |
| 5 | 60 | 1/8 | .18 | 25 | 26 | <1% | 90.5 | 4.65 | Excellent product |
| 6 | 60 | 1/8 | .18 | 25 | 27 | <1% | 92.5 | 5.08 | Excellent product |
| 7 | 60(C) | 1/8 | .30 | 25 | 26 | No | 97.8 | 4.26 | Insufficient molecular weight |
| 8 | 60(C) | 3/16 | .30 | 25 | 55 | — | — | — | Runaway polymerization |
| 9 | 60(C) | 3/16 | .30 | 25 | 56 | — | — | — | Runaway polymerization |
| 10 | 60(C) | 1/4 | .30 | 25 | 63 | — | — | — | Runaway polymerization |

CODE FOR TABLE III $^{(a)}$Low conversion evident from appearance of non-rubbery viscous gel containing substantial free flowing liquid.
$^{(b)}$Bath temperature required to prevent runaway polymerization was — 35°C.
$^{(c)}$comparative As can again be seen, at temperatures below the range claimed herein, e.g., 5°C., not all of the monomer goes into solution and the resulting conversion is very low. Temperatures over about 35°C. yielded insolubles and low molecular weight.

Monomer solids concentration and gel thickness are shown as interdependent. An increase in either is economically advantageous but decreases the possibility of removing the heat of polymerization as fast as it is generated and thereby preventing the temperature from rising to undesirable levels. At high monomer solids levels, lower reaction mass thickness is required.

EXAMPLE 4

The procedure of Example 1 is again followed. The temperature is 25°C., the reaction mass is ⅛ inch thick, the pH is 5.5 and the $NaBrO_3$ concentration is 0.02%. Various runs are conducted varying the monomer solids content, polymerization time and the sulfite to bromate catalyst concentration. The results are set forth in Table IV, below.

EXAMPLE 5

Again following the procedure of Example 1 except that the pH is 5.5, the $NaBrO_3$ concentration is 0.02% and the sulfitebromate ratio is 0.30, the effects of running the polymerization reaction at varied polymerization times is shown in Table V, below.

TABLE V

| Run No. | Solids (%) | PZN Time (hrs.) | Insolubles | Conversion (%) | Brookfield Viscosity of 0.1% Polymer Solution (C.P.) |
|---|---|---|---|---|---|
| 1 | 10(C) | 3 | No | 33 | 6.31 |
| 2 | 20(C) | 3 | No | 55 | 5.74 |
| 3 | 35 | 3 | No | 97.5 | 5.30 |
| 4 | 50 | 3 | <1% | 99.6 | 5.78 |
| 5 | 35 | 1.5 | No | 96.9 | 4.90 |
| 6 | 50 | 1.0 | <1% | 96.3 | 5.00 |

(C) = Comparative
PZN = polymerization

TABLE IV

| Run No. | Solilds (%) | Moles $Na_2SO_3$ Mole $NaBrO_3$ | PZN Time (hrs.) | Insolubles | Conversion (%) | Brookfield Viscosity of 0.1% Polymer Solution (C.P.) | Molecular Weight × $10^{-6}$ |
|---|---|---|---|---|---|---|---|
| 1 | 35 | .18 | 6.0 | No | 96.1 | 7.48[a] | 20.0 |
| 2 | 35 | .30 | 1.5 | No | 96.5 | 6.45 | — |
| 3 | 35 | .30 | 3.0 | No | 97.1 | 6.47 | — |
| 4 | 45 | .18 | 3.0 | No | 97.7 | 6.45 | — |
| 5 | 45 | .18 | 3.0 | No | 98.9 | 6.39 | — |
| 6 | 45 | .18 | 3.0 | No | 99.2 | 6.49 | — |
| 7 | 45 | .18 | 3.0 | No | 98.2 | 6.43 | — |
| 8 | 50 | .18 | 1.5 | No | 99.0 | 6.61[a] | 13.5 |
| 9 | 50 | .18 | 1.5 | No | 98.7 | 6.40 | — |
| 10 | 50 | .18 | 1.5 | No | 97.9 | 6.56 | — |
| 11 | 50 | .18 | 1.5 | No | 96.6 | 6.35 | — |
| 12 | 50 | .18 | 1.5 | <1% | 92.9 | 6.96 | — |
| 13 | 50 | .18 | 1.5 | No | 97.2 | 6.72 | — |
| 14 | 50 | .18 | 1.5 | No | 98.1 | 6.55 | — |
| 15 | 50 | .18 | 1.5 | No | 98.3 | 7.30 | — |
| 16 | 50 | .18 | 3.0 | No | 97.2 | 7.06[a] | 18.3 |

PZN = polymerization
[a]The Intrinsic Viscosities of Runs 1, 8 and 16 were 24.7, 19.1 and 23.3 dl/g, respectively.

The results set forth in Table IV clearly illustrate that high molecular weight acrylamide polymers can be produced according to the instant invention at a temperature significantly above those indicated as limiting in U.S. Pat. No. 3,002,960. The disclosure of said patent indicates that temperatures below about 10°C. must be employed before intrinsic viscosities of at least 18 deciliters (Brookfield Viscosity of 6.30) per gram can be recovered. Since at 50% solids, acrylamide is not completely soluble in water below 11°C., acrylamide polymers of this molecular weight cannot be made according to the teachings of this patent, see Run No. 1 of Table III.

Table IV, however, shows that high molecular weight acrylamide polymers can unexpectedly be produced according to the instant process at normal room temperature. A Brookfield viscosity of 7.48 C.P. has an intrinsic viscosity of at least 24.7 dl/g, which has a corresponding molecular weight of 20 million.

Table V illustrates the advantage of a shorter polymerization time afforded by the process of the instant invention. It can be seen that conversion after 3 hours increases with increased monomer solids concentration and that at 35% and 50% monomer solids, conversion even after 1–1.5 hours is considerably higher than at 10–20% solids after three hours.

EXAMPLE 6

(Comparative)

According to the procedure of Example 1, the effects of polymerization at 25% monomer solids and a reaction mass thickness of ⅛ inch, all else in accordance with U.S. Pat. No. 3,002,960, i.e., polymerization at a pH of 4.5 and a temperature of 25°C. for 5 hours, is shown in Table VI, below.

TABLE VI

| Run No. | NaBrO$_3$[a] Conc. (%) | Moles Na$_2$SO$_3$ Mole NaBrO$_3$ | Maximum Temp. (°C.) | Insolubles | Conversion (%) | Brookfield Viscosity of 0.1% Polymer Solution (C.P.) | Remarks |
|---|---|---|---|---|---|---|---|
| 1 | .01(C) | .24 | 25 | Yes | 56 | — | Low conversion |
| 2 | .01(C) | 1.20 | 26 | No | 98.7 | 4.00 | Insufficient molecular weight[b] |
| 3 | .025(C) | .90 | 25 | No | 98.9 | 2.50 | Insufficient molecular weight[b] |
| 4 | .03(C) | .12 | 25 | Yes | 72.0 | 2.08 | Insolubles and low conversion |
| 5 | .05(C) | .12 | 25 | No | 81.0 | 6.02 | Low conversion |
| 6 | .05(C) | .60 | 25 | No | 99.0 | 2.18 | Insufficient molecular weight[b] |
| 7 | .075(C) | .06 | 26 | Yes | 72.0 | — | Insolubles and low conversion |
| 8 | .075(C) | .30 | 26 | No | 97.7 | 2.46 | Insufficient molecular weight[b] |
| 9 | .10(C) | .12 | 26 | No | 95.3 | 4.32 | Insufficient molecular weight[b] |

CODE FOR TABLE VI

[a] Weight % NaBrO$_3$ on monomer.
[b] Bath molecular weight less than 8 million at viscosity less than 4.40.
[c] Comparative As can be seen, Table VI clearly indicates that at 25% monomer solids, reaction conditions expressly indicated in the above-identified U.S. patent as useful, result in polymerization shortcomings which render the runs unsuitable for commercial production of acrylamide polymer at monomer solids as low as 25%.

EXAMPLES 7-10

When acrylic acid (25%), methacrylic acid (10%), acrylonitrile (5%) and 2-hydroxyethylmethacrylate (5%) are added as comonomers with the acrylamide and polymerized according to the procedure of Example 2, results similar to those shown in Table II, Runs 5-14, are recorded.

I claim:

1. A method of producing a substantially completely non-carboxylated, substantially completely water-soluble polymer of acrylamide having an intrinsic viscosity of at least 13 and therefore a molecular weight of at least about 8 million which comprises subjecting a reaction media consisting essentially of (A) acrylamide, (B) up to 50%, by weight, based on the weight of acrylamide, of a monomer copolymerizable therewith (C) a sodium bromate-sodium sulfite catalyst and (D) water, to polymerizing conditions comprising a temperature of from about 10°C. to about 30°C. and a pH of from about 4.7 to about 5.9, said reaction media having a monomer solids content of from about 30% to about 60%, at least one dimension of said reaction media mass having a thickness of not more than about ¾ inch the catalyst concentration being (1) within the area of curve ABCDA of the drawings for at least 30% monomer solids, (2) within the area of curve EFGHE of the drawings for at least 40% monomer solids and (3) within the area of curve JKLMJ of the drawings for at least 50% monomer solids.

2. A method according to claim 1 wherein the monomer polymerized is acrylamide.

3. A method according to claim 1 wherein the monomer solids concentration is at least about 45%.

4. A method according to claim 1 wherein the pH is about 5.5.

5. A method according to claim 1 wherein the reaction media mass has a thickness of ⅛ – ¾ inches.

* * * * *

UNITED STATES PATENT OFFICE
CERTIFICATE OF CORRECTION

Patent No. 3,929,751  Dated December 30, 1975

Inventor(s) DAVID BENEDICT GERSHBERG

It is certified that error appears in the above-identified patent and that said Letters Patent are hereby corrected as shown below:

Col. 2, line 23. Change "fromm" to -- from --.
Col. 3, Table 1 in the heading. Change " Moles " to -- Moles --.
$$\frac{Na_2SO_3}{Mole\ NaBrO_3} \quad \frac{Na_2SO_3}{Mole\ NaBrO_3}$$

Col. 5, Table II in the heading. Change " Moles " to -- Moles --.
$$\frac{Na_2SO_3}{Mole\ NaBrO_3} \quad \frac{Na_2SO_3}{Mole\ NaBrO_3}$$

Col. 5, Table III, in the heading. Change "Moles $Na_2SO_3$" to -- Moles $Na_2SO_3$ --.
$$\frac{}{Mole\ NaBrO_3} \quad \frac{}{Mole\ NaBrO_3}$$

Col. 6, Table III, Run No. 10 under Remarks. Change "21 1" to -- <1 --. Col. 7, line 16. Change "1/8" to -- 1/4 --;
Col. 7, Table IV, in the heading. Change "Moles $Na_2SO_3$" to -- Moles $Na_2SO_3$ -- .
$$\frac{}{Mole\ NaBrO_3} \quad \frac{}{Mole\ NaBrO_3}$$

Col. 8, line 5. Change "sulfitebromate" to -- sulfite-bromate --.
Col. 9, Table VI, in the heading. Change "Moles $Na_2SO_3$" to -- Moles $Na_2SO_3$ --;
$$\frac{}{Mole\ NaBrO_3} \quad \frac{}{Mole\ Na\ BrO_3}$$

Col. 9, Table VI, under Code For Table VI. Change "Bath" to -- Polymer --.

Signed and Sealed this first Day of June 1976

[SEAL]

Attest:

RUTH C. MASON
Attesting Officer

C. MARSHALL DANN
Commissioner of Patents and Trademarks